United States Patent Office 3,769,289
Patented Oct. 30, 1973

3,769,289
HEXACHLOROPENTADIENE ADDUCTS OF UNSATURATED AMIDES
Robert R. Mod, Frank C. Magne, and Evald L. Skau, New Orleans, La., assignors to the United States of America as represented by the Secretary of Agriculture
No Drawing. Original application Nov. 21, 1969, Ser. No. 878,922, now Patent No. 3,663,582. Divided and this application Dec. 16, 1971, Ser. No. 208,947
Int. Cl. C07d 29/30
U.S. Cl. 260—293.56
3 Claims

ABSTRACT OF THE DISCLOSURE

This invention relates to certain new nitrogen-containing compounds, more particularly to N-substituted and N,N-disubstituted amides, the acyl moieties of which are the acyl moieties of the hexachlorocyclopentadiene adducts of either 9-octadecenoic or 10-undecenoic acids.

The compounds which are the subject of this invention are characterized by the fact that as growth inhibitors they are effective against a variety of bacteria, yeast, and molds, some of which are pathogenic. They are also useful as plasticizers.

---

This is a division of application Ser. No. 878,922, filed Nov. 21, 1969, now U.S. Pat. No. 3,663,582.

A non-exclusive, irrevocable, royalty-free license in the invention herein described, throughout the world for all purposes of the United States Government, with the power to grant sublicenses for such purposes, is hereby granted to the Government of the United States of America.

The compounds which are the subject of this invention include N-acyl derivatives of the following primary and secondary amines and cyclic imines: dimethylamine, diethylamine, dibutylamine, N-methyl-propylamine, N-meth-butylamine, allylamine, N-methyl-allylamine, N,N-bis(2-ethoxyethyl)amine, N-ethyl-2-ethoxyethylamine, N-ethyl - 3 - ethoxypropylamine, pyrrolidine, piperidine, 2-methylpiperidine, morpholine, azabicyclo[3.2.2]nonane, piperazine, N-methylpiperazine, and benzylamine, the acyl group being that of the hexachlorocyclopentadiene adduct of either 9-octadecenoic or 10-undecenoic acid.

The compounds which are the subject of this invention are:

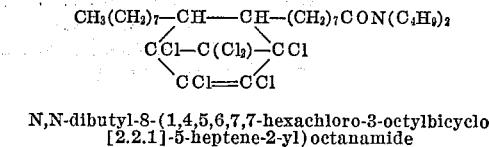

N,N-dibutyl-8-(1,4,5,6,7,7-hexachloro-3-octylbicyclo [2.2.1]-5-heptene-2-yl)octanamide

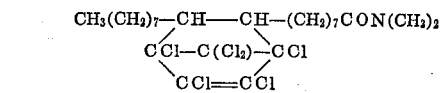

N,N-dimethyl-8-(1,4,5,6,7,7-hexachloro-3-octylbicyclo [2.2.1]-5-heptene-2-yl)octanamide

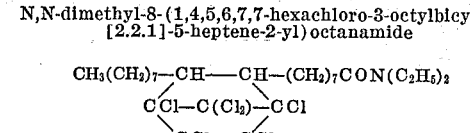

N,N-diethyl-8-(1,4,5,6,7,7-hexachloro-3-octylbicyclo [2.2.1]-5-heptene-2-yl)octanamide

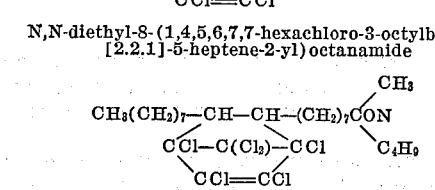

N-methyl-N-butyl-8-(1,4,5,6,7,7-hexachloro-3-octylbicyclo [2.2.1]-5-heptene-2-yl)octanamide

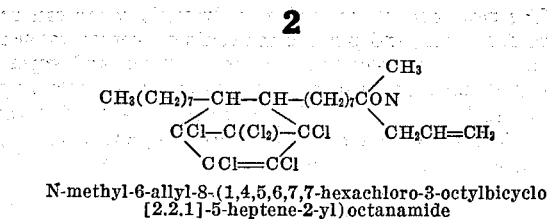

N-methyl-6-allyl-8-(1,4,5,6,7,7-hexachloro-3-octylbicyclo [2.2.1]-5-heptene-2-yl)octanamide

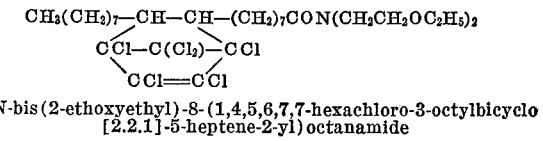

N,N-bis(2-ethoxyethyl)-8-(1,4,5,6,7,7-hexachloro-3-octylbicyclo [2.2.1]-5-heptene-2-yl)octanamide

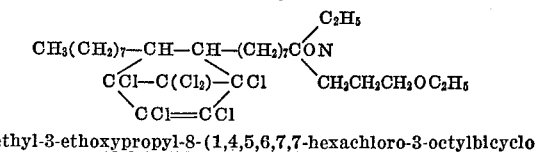

N-ethyl-3-ethoxypropyl-8-(1,4,5,6,7,7-hexachloro-3-octylbicyclo [2.2.1]-5-heptene-2-yl)octanamide

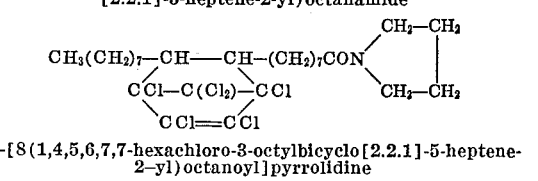

N-[8(1,4,5,6,7,7-hexachloro-3-octylbicyclo[2.2.1]-5-heptene-2-yl)octanoyl]pyrrolidine

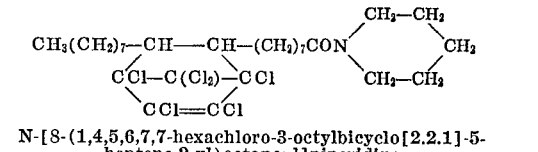

N-[8-(1,4,5,6,7,7-hexachloro-3-octylbicyclo[2.2.1]-5-heptene-2-yl)octanoyl]piperidine

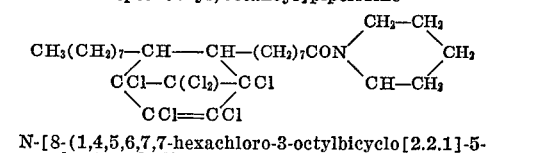

N-[8-(1,4,5,6,7,7-hexachloro-3-octylbicyclo[2.2.1]-5-heptene-2-yl)octanoyl]-2-methylpiperidine

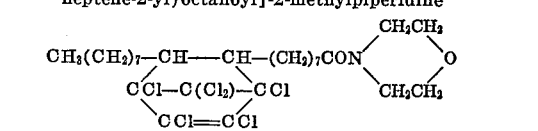

N-[8-(1,4,5,6,7,7-hexachloro-3-octylbicyclo[2.2.1]-5-heptene-2-yl)octanoyl]morpholine

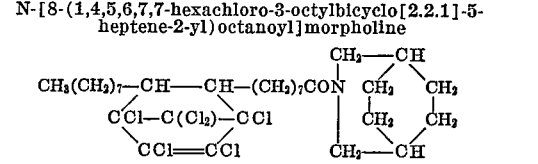

N-[8-(1,4,5,6,7,7-hexachloro-3-octylbicyclo[2.2.1]-5-heptene-2-yl)octanoyl]-3-azabicyclo[3.2.2]nonane

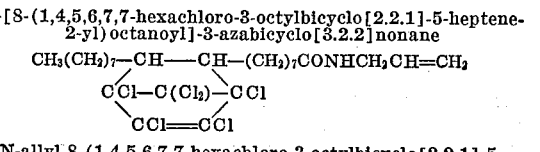

N-allyl-8-(1,4,5,6,7,7-hexachloro-3-octylbicyclo[2.2.1]-5-heptene-2-yl)octanamide

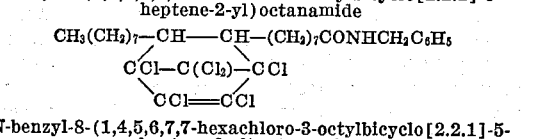

N-benzyl-8-(1,4,5,6,7,7-hexachloro-3-octylbicyclo[2.2.1]-5-heptene-2-yl)octanamide

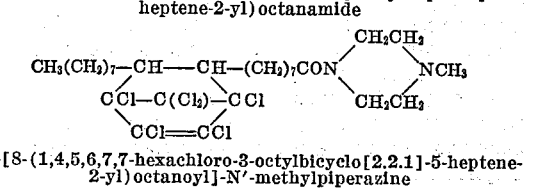

N-[8-(1,4,5,6,7,7-hexachloro-3-octylbicyclo[2.2.1]-5-heptene-2-yl)octanoyl]-N'-methylpiperazine

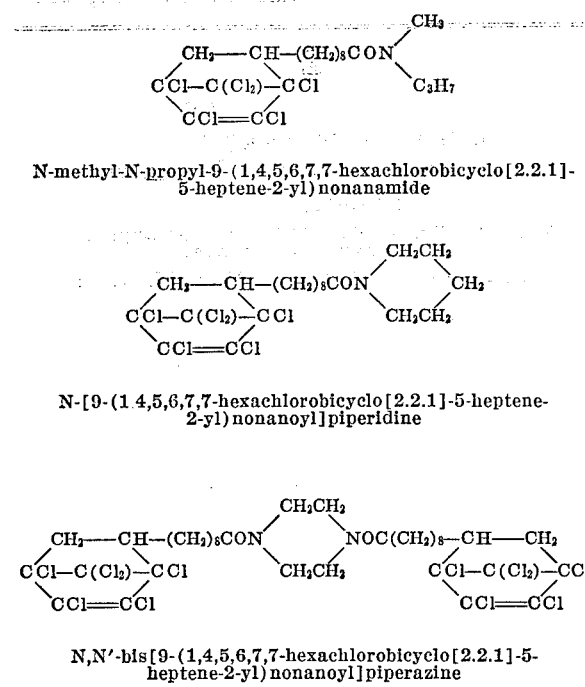

N-methyl-N-propyl-9-(1,4,5,6,7,7-hexachlorobicyclo[2.2.1]-5-heptene-2-yl)nonanamide N-[9-(1,4,5,6,7,7-hexachlorobicyclo[2.2.1]-5-heptene-2-yl)nonanoyl]piperidine N,N'-bis[9-(1,4,5,6,7,7-hexachlorobicyclo[2.2.1]-5-heptene-2-yl)nonanoyl]piperazine The new nitrogen-containing compounds which are the subject of this invention were prepared by conventional methods.

The bioactivity of these various new nitrogen-containing compounds has been established by us in vitro but, as will be obvious to those skilled in the arts pertaining to the growth inhibition of bacteria, yeast, and molds, the compounds, besides being used as such, can for utilitarian purposes be formulated using a liquid, viscous, or solid diluent.

The diluent or extender must be inert with respect to the compound involved and since this is the only significant requirement, a wide variety of these agents is operable, among which are petroleum jellies, various alcohols, polyols, vegetable oils, and the like.

The compounds of this invention were screened for their antimicrobial activity against two bacteria—*Bacillus sp.*, and *Pseudomonas sp.*—and a number of pathogenic yeasts or molds—*Aspergillus flavus, Candida albicans, Microsporum gypseum, Trichophyton rubrum,* and *Trichophyton violaceum.*

Difco Bacto Dehydrated nutrient Agar at pH 6.8, Dico Bacto Dehydrated Yeast Morphological Agar at pH 4.5, and Difco Dehydrated Mycological Agar at pH 7.0 were used to test the inhibition of the bacteria, yeast, and mold cultures, respectively. The micro-organisms used were obtained from stock cultures. Seeded agar plates were used to measure the antibacterial activity against bacteria. Hardened agar plates inoculated either by streaking or pouring the culture onto the plates were employed in the activity estimations against molds. Standard size (6.5 mm.) paper discs wetted with the test compound were placed on the surface of the agar plates inoculated with the test organisms. When streaked plates were used the test compounds were added onto the specified areas.

To eliminate any error which could result from an insufficient number of tests, a minimum of three experiments employing duplicate plates was used for measuring the antimicrobial activity of each compound.

All test plates were incubated at the optimum growing temperature for each organism. Zones of inhibition were compared with those of the controls after periodic readings after 3, 5, and 7 days. The 7-day readings compiled in Table I show that the compounds were effective as growth inhibitors against specific organisms.

TABLE I

| Micro-organisms [b] | Antimicrobial activity [a] | | | | | | |
|---|---|---|---|---|---|---|---|
| | A | B | C | D | E | F | G |
| Example No.: | | | | | | | |
| 2 | O | | OO | — | O | | |
| 3 | ± | + | | + | | OO | — |
| 4 | — | | O | — | | | |
| 5 | | | O | O | O | | |
| 6 | O | | O | — | | | |
| 7 | OO | — | | + | | — | — |
| 8 | — | | O | — | | | |
| 9 | O | | OO | O | — | | |
| 10 | — | OO | | — | | — | — |
| 11 | — | | — | — | | | |
| 12 | O | O | | — | | — | OO |
| 13 | O | | O | — | | | |
| 14 | O | | O | — | O | | |
| 15 | O | | OO | O | O | | |
| 16 | O | OO | | OO | | — | — |
| 17 | — | + | | + | | | |
| 19 | O | | O | O | OO | | |
| 20 | OO | | O | OO | O | | |

[a] += Zone of inhibition extends up to 0.5 cm. from disc; OO = organism failed to grow on disc; O = slight growth of organism on disc; —=no inhibition detectable.
[b] A=*Aspergillus flavus*; B=*Candida albicans*; C=*Trichophytan rubrum*; D=*Trichophyton violaceum*; E=*Microporsum gypseum*; F=Bacillus sp.; G=Pseudomonas sp.

Specific examples showing the preparation of each of the new compounds being claimed are set forth below along with appropriate data in Table I which establish the growth inhibiting properties of the claimed compounds.

EXAMPLE 1

The hexachlorocyclopentadiene adduct of oleoyl chloride was prepared by reacting, under a nitrogen blanket, 80 grams of oleoyl chloride with 145.2 grams of hexachlorocyclopentadiene in a flask equipped with a condenser for 28 hours at 135° C. Since neither hexachlorocyclopentadiene nor the adduct absorbs bromine, iodine values were used to determine the percentage of the oleoyl chloride converted. The reaction mixture showed a 75% conversion to the adduct. The excess hexachlorocyclopentadiene was removed by stripping at reduced pressure. Aliquots of the product, 8-(1,4,5,6,7,7-hexachloro-3-octylbicyclo[2.2.1] - 5-heptene-2-yl)octanoyl chloride, were used to prepare the corresponding N-substituted amides described in Examples 2 to 16.

EXAMPLE 2

The N,N-dibutyl amide of the hexachlorocyclopentadiene adduct of oleic acid was prepared by dissolving 14.6 grams of dibutylamine and 11.4 grams of triethylamine in benzene and adding dropwise with stirring 57 grams of the oleoyl chloride adduct prepared by the procedure of Example 1. After stirring for an additional hour, the reaction mixture was filtered, washed successively with dilute hydrochloric acid and water, dried over anhydrous sodium sulfate, percolated through a column of activated alumina to remove residual free acid, and stripped. N,N-dibutyloleamide was removed by two urea clathrations. The product obtained by stripping the filtrate was dissolved in commercial hexane and residual urea was removed by washing with hydrochloric acid and water. The solution was dried over anhydrous sodium sulfate, filtered, and stripped. The product, N,N-dibutyl-8-(1,4,5,6,7,7-hexachloro - 3 - octylbicyclo[2.2.1]-5-heptene-2-yl) octanamide, gave the following analysis: C, 55.56% (theory 55.86); H, 7.62% (theory 7.71); N, 1.95% (theory 2.10); Cl, 40.84% (theory 40.59).

This compound was tested as a plasticizer for vinyl chloride-vinyl acetate (95:5) copolymer resin in the following formulation:

| | Percent |
|---|---|
| Vinyl chloride resin | 63.5 |
| Plasticizer | 35.0 |
| Stearic acid | 0.5 |
| Basic lead carbonate | 1.0 |

This formulation was milled, molded, and tested. The resulting molded plasticized resin showed no evidence of exudation or migration to the surface during shelf storage of 30 days and had the following properties: tensile strength, 3380 (3130) p.s.i.; 100% modulus, 3140 (1640) p.s.i.; elongation, 260 (360) percent; brittle point, +3° (−31°) C.; volatility loss 0.03 (1.5) percent, soapy water extractability 0.00 (3.0) percent. The corresponding properties using the control plasticizer, di-2-ethylhexyl phthalate (DOP), in the same formulation are given in parenthesis. The compound is therefore a good compatible primary plasticizer giving a plasticized stock showing extremely low volatility loss and soapy water extractability. The plasticized resin was also less flammable than DOP.

EXAMPLE 3

The N,N-dimethylamide of the hexachlorocyclopentadiene adduct of oleic acid was prepared by the procedure of Example 2 using 1.1 grams of anhydrous dimethylamine, 2.4 grams of methylamine, and 12 grams of the oleoylchloride adduct prepared by the procedure of Example 1. The product, N,N-dimethyl-8-(1,4,5,6,7,7-hexachloro-3-octylbicyclo[2.2.1]-5 - heptene-2-yl)octanamide, gave the following analysis: C, 51.50% (theory 51.56); H, 6.73% (theory 6.75); N, 2.17% (theory 2.40); Cl, 36.48% (theory 36.53).

EXAMPLE 4

The N,N-diethyl amide of the hexachlorocyclopentadiene adduct of oleic acid was prepared by the procedure of Example 2 using 2.7 grams of diethylamine, 3.7 grams of triethylamine, and 17 grams of the oleoyl chloride adduct prepared by the procedure of Example 1. The product, N,N - diethyl-8-(1,4,5,6,7,7-hexachloro-3-octylbicyclo[2.2.1]-5-heptene-2-yl)octanamide, gave the following analysis: C, 55.09% (theory 53.12); H, 7.79% (theory 7.10); N, 2.50% (theory 2.20); Cl, 34.58% (theory 34.86).

EXAMPLE 5

The N-methyl-N-butyl amide of the hexachlorocyclopentadiene adduct of oleic acid was prepared by the procedure of Example 2 using 2.5 grams of N-methylbutylamine, 2.9 grams of triethylamine and 15 grams of the oleoyl chloride adduct prepared by the procedure of Example 1. The product, N-methyl - N - butyl-8-(1,4,5,6,7,-7-hexachloro-3-octylbicyclo[2.2.1]-5-heptene - 2 - yl) octanamide, gave the following analysis: C, 55.77% (theory 53.86); H, 7.61% (theory 7.26); N, 2.26% (theory 2.24); Cl, 32.07% (theory 34.07).

EXAMPLE 6

The N-methyl-N-allyl amide of the hexachlorocyclopentadiene adduct of oleic acid was prepared by the procedure of Example 2 using 3.4 grams of N-methylallylamine, 4.9 grams of triethylamine and 25 grams of the oleoyl chloride adduct prepared by the procedure of Example 1. The product, N-[8-(1,4,5,6,7,7-hexachloro-3-octylbicyclo[2.2.1] - 5 - heptene-2-yl)octanamide, gave the following analysis: C, 53.90% (theory 53.50); H, 7.22% (theory 6.79); N, 2.42% (theory 2.30); Cl, 32.84% (theory 34.97).

EXAMPLE 7

The N-bis(2-ethoxyethyl) amide of the hexachlorocyclopentadiene adduct of oleic acid was prepared by the procedure of Example 2 using 5 grams of bis(2-ethoxyethyl) amine, 3.1 grams of triethylamine and 13.6 grams of the oleoyl chloride adduct prepared by the procedure of Example 1. The product, N,N-bis(2-ethoxyethyl) - 8 - (1,4,5,6,7,7-hexachloro-3-octylbicyclo[2.2.1]-5-heptene-2-yl)octanamide, gave the following analysis: C, 55.71% (theory 53.32); H, 7.96% (theory 7.36); N, 2.32% (theory 2.44); Cl, 26.52% (theory 30.47).

EXAMPLE 8

The N-ethyl-N-3-ethoxypropyl amide of the hexachlorocyclopentadiene adduct of oleic acid was prepared by the procedure of Example 2 using 3.8 grams of N-ethyl-N-3-ethoxypropylamine, 2.9 grams of triethylamine and 15 grams of the oleoyl chloride adduct prepared by the procedure of Example 1. The product, N-ethyl-N-3-ethoxypropyl-8-(1,4,5,6,7,7-hexachloro - 3 - octylbicyclo[2.2.1]-5-heptene-2-yl)octanamide, gave the following analysis: C, 55.60% (theory 53.90); H, 7.70% (theory 7.39); N, 2.15% (theory 2.10); Cl, 29.63% (theory 31.83).

EXAMPLE 9

N-[8-(1,4,5,6,7,7-hexachloro - 3 - octylbicyclo[2.2.1]-5-heptene-2-yl)octanoyl]pyrrolidine was prepared by the method of Example 2 using 2.1 grams of pyrrolidine, 2.9 grams of triethylamine and 15 grams of the oleoyl chloride adduct prepared by the procedure of Example 1. The product, N-[8-(1,4,5,6,7,7-hexachloro-3-octylbicyclo-[2.2.1]-5-heptene-2-yl)octanoyl]pyrrolidine gave the following analysis: C, 53.34% (theory 53.30); H, 6.78% (theory 6.79); N, 2.21% (theory 2.30); Cl, 35.13% theory 34.97).

EXAMPLE 10

The piperidide of the hexachlorocyclopentadiene adduct of oleic acid was prepared by the procedure of Example 2 using 2.8 grams of piperidine, 3.3 grams of triethylamine, and 15 grams of the oleoyl chloride adduct prepared by the procedure of Example 1. The product, N-[8-(1,4,5,6,7,7 - hexachloro - 3 - octylbicyclo[2.2.1]-5-heptene-2-yl)octanoyl]piperidine, gave the following analysis: C, 56.46% (theory 54.03); H, 7.90% (theory 6.96); N, 2.24% (theory 2.25); Cl, 29.92% (theory 34.08).

EXAMPLE 11

The 2-methylpiperidide of the hexachlorocyclopentadiene adduct of oleic acid was prepared by the procedure of Example 2 using 3.2 grams of 2-methylpiperidine, 3.3 grams of triethylamine, and 15 grams of the oleoyl chloride adduct prepared by the procedure of Example 1. The product, N-[8-(1,4,5,6,7,7-hexachloro-3-octylbicyclo-[2.2.1]-5-heptene-2-yl)octanoyl] - 2 - methylpiperidine, gave the following analysis: C, 57.28% (theory 54.73); H, 7.77% (theory 7.13); N, 2.49% (theory 2.20); Cl, 28.95% (theory 28.95).

EXAMPLE 12

The morpholide of the hexachlorocyclopentadiene adduct of oleic acid was prepared by the procedure of Example 2 by using 2.2 grams of morpholine, 2.3 grams of triethylamine, and 11 grams of the oleoyl chloride adduct prepared by the procedure of Example 1. The product, N-[8-(1,4,5,6,7,7-hexachloro - 3 - octylbicyclo[2.2.1]-5-heptene-2-yl)octanoyl]morpholine, gave the following analysis: C, 52.67% (theory 51.93); H, 6.80% (theory 6.62); N, 2.40% (theory 2.24); Cl, 32.83% (theory 34.08).

EXAMPLE 13

N-[8-(1,4,5,6,7,7-hexachloro - 3 - octylbicyclo[2.2.1]-5 - heptene - 2 - yl)octanoyl]-3-azabicyclo[3.2.2]nonane was prepared by the procedure of Example 2 using 4 grams of 3-azabicyclo[3.2.2]nonane, 3.3 grams of triethylamine, and 15 grams of the oleoyl chloride adduct prepared by the procedure of Example 1. The product, N-[8-(1,4,5,6,7,7-hexachloro - 3 - octylbicyclo[2.2.1]-5-heptene-2-yl)octanoyl]-3-azabicyclo[3.2.2]nonane gave the following analysis: C, 58.63% (theory 56.21); H, 7.70% (theory 7.15); N, 2.28% (theory 2.11); Cl, 27.94% (theory 32.12).

EXAMPLE 14

The N-allyl amide of the hexachlorocyclopentadiene adduct of oleic acid was prepared by the procedure of Example 2 using 1.7 grams of allylamine, 2.9 grams of triethylamine, and 15 grams of the oleoylchloride adduct prepared by the procedure of Example 1. The product, N-allyl-8-(1,4,5,6,7,7 - hexachloro - 3 - octylbicyclo

[2.2.1]-5-heptene - 2 - yl)octanamide, gave the following analysis: C, 53.38% (theory 52.54); H, 6.72% (theory 6.61); N, 2.31% (theory 2.35); Cl, 34.71% (theory 35.80).

EXAMPLE 15

The N-benzyl amide of the hexachlorocyclopentadiene adduct of oleic acid was prepared by the procedure of Example 2 using 3.1 grams of benzylamine, 2.9 grams of triethylamine, and 15 grams of the oleoyl chloride adduct prepared by the procedure of Example 1. The product, N-benzyl - 8 - (1,4,5,6,7,7 - hexachloro - 3 - octylbicyclo [2.2.1]-5-heptene - 2 - yl)octamide, gave the following analysis: C, 55.88% (theory 55.91); H, 6.56% (theory 6.41); N, 2.11% (theory 2.17); Cl, 33.16% (theory 33.02).

EXAMPLE 16

N-[8-(1,4,5,6,7,7-hexachloro - 3 - octylbicyclo[2.2.1]-5-heptene - 2 - yl)octanoyl]-N'-methylpiperazine was prepared by adding dropwise with stirring 25.6 grams of the oleoyl chloride adduct of Example 1 to a benzene solution of 5 grams of N-methylpiperazine and 5.1 grams of triethylamine. After stirring for an additional hour the reaction mixture was filtered. The filtrate was dried over sodium sulfate, percolated through activated alumina to remove residual acid chloride adduct, and stripped. 25 grams of the product was added to a hot solution of methanol containing 100 grams of urea. The solution was allowed to cool to room temperature and stored at 0° C. overnight. The urea-complexed crystals were filtered and pressed dry after which an additional 100 grams of urea was dissolved in the filtrate. The crystallization and filtration were repeated. The product obtained by stripping the methanol from the filtrate was dissolved in chloroform, filtered to remove residual urea, and stripped. The product N-[8-(1,4,5,6,7,7 - hexachloro - 3 - octylbicyclo [2.2.1]-5-heptene - 2 - yl)octanoyl]-N'-methylpiperazine, gave the following analysis: C, 53.99% (theory 52.76); H, 7.15% (theory 6.96); N, 5.34% (theory 4.40); Cl, 29.95% (theory 33.38).

EXAMPLE 17

The N-methyl-N-propyl amide of the hexachlorocyclopentadiene adduct of 10-undecenamide was prepared by reacting under a nitrogen blanket 7 grams of N-methyl-N-propyl-10-undecenamide with 8 grams of hexachlorocyclopentadiene in a flask equipped with a condenser for 10 hours at 135° C. The reaction mixture was dissolved in methyl alcohol and filtered. Unreacted hexachlorocyclopentadiene was removed by stripping under reduced pressure. Unreacted amide was removed by two urea clathrations. The product, N-methyl-N-propyl-9-(1,4,5,6,7,7-hexachlorobicyclo[2.2.1]-5-heptene - 2 - yl)nonamide, gave the following analysis: C, 48.80% (theory 46.90); H, 6.31% (theory 5.71); N, 2.92% (theory 2.74); Cl, 40.92% (theory 41.54).

EXAMPLE 18

The hexachlorocyclopentadiene adduct of 10-undecenoyl chloride was prepared from 10-undecenoyl chloride by the procedure of Example 1. Aliquots of the product, 9-(1,4,5,6,7,7-hexachlorobicyclo[2.2.1]-5-heptene - 2 - yl) nonanoyl chloride, were used to prepare the N-substituted amides of Examples 19 and 20.

EXAMPLE 19

The piperidide of the hexachlorocyclopentadiene adduct of 10-undecenoic acid was prepared by the procedure of Example 2 using 3.6 grams of piperidine, 4.3 grams of triethylamine, and 20 grams of the 10-undecenoyl chloride adduct prepared in Example 18. The product, N-[9-(1,4,5,6,7,7-hexachlorobicyclo[2.2.1]-5 - heptene - 2 - yl) nonanoyl]piperidine, gave the following analysis: C, 48.01% (theory 48.12); H, 5.63% (theory 5.58); N, 2.50% (theory 2.67); Cl, 40.84% (theory 40.59).

EXAMPLE 20

N,N'-bis[9 - (1,4,5,6,7,7 - hexachlorobicyclo[2.2.1]-5-heptene - 2 - yl)nonanoyl]piperazine was prepared by the procedure of Example 2 using 1.8 grams anhydrous piperazine, 4.3 grams triethylamine, and 20 grams of the 10-octadecenoyl chloride adduct prepared in Example 18. The product, N,N-bis[9 - (1,4,5,6,7,7 - hexachlorobicyclo [2.2.1]-5-heptene-2-yl)nonanoyl]piperazine, gave the following analysis: C, 44.90% (theory 44.84); H, 5.01% (theory 4.81); N, 2.73% (theory 2.91); Cl, 44.30% (theory 44.63).

The results of the screening evaluation of the products of Examples 1 to 20, compiled in Table I, show their effectiveness as growth inhibitors against specific organisms.

We claim:
1. N-[8-(1,4,5,6,7,7 - hexachloro-3-octylbicyclo[2.2.1]-5-heptene-2-yl)octanoyl]piperidine.
2. N-[8-(1,4,5,6,7,7 - hexachloro-3-octylbicyclo[2.2.1]-5-heptene-2-yl)octanoyl]-2-methylpiperidine.
3. N-[9-(1,4,5,6,7,7-hexachlorobicyclo[2.2.1] - 5 - heptene-2-yl)nonanoyl]piperidine.

References Cited
UNITED STATES PATENTS

| | | | |
|---|---|---|---|
| 2,839,553 | 6/1958 | Soloway | 260—557 |
| 2,872,483 | 2/1959 | Bloch | 260—557 |
| 3,334,087 | 8/1967 | Brown et al. | 260—239 BA |
| 3,404,146 | 10/1968 | Skau et al. | 260—239 BA |

HENRY R. JILES, Primary Examiner

G. T. TODD, Assistant Examiner

UNITED STATES PATENT OFFICE
CERTIFICATE OF CORRECTION

Patent No. 3,769,289        Dated October 30, 1973

Inventor(s) Robert R. Mod, Frank C. Magne and Evald L. Skau

It is certified that error appears in the above-identified patent and that said Letters Patent are hereby corrected as shown below:

The title in the above patent should be corrected to read as follows:

HEXACHLOROCYCLOPENTADIENE ADDUCTS OF UNSATURATED AMIDES

Signed and sealed this 3rd day of December 1974.

(SEAL)
Attest:

McCOY M. GIBSON JR.
Attesting Officer

C. MARSHALL DANN
Commissioner of Patents